United States Patent
Holtz et al.

(10) Patent No.: US 7,302,330 B1
(45) Date of Patent: Nov. 27, 2007

(54) TORQUE CONVERTER CLUTCH DYNAMIC CONTROL

(75) Inventors: Vincent Holtz, Rosheim (FR); Jean Sieffert, Lingolsheim (FR); Lionel Toussaint, Fegersheim (FR); Regis Casteran, Strasbourg (FR); Christopher J. Trush, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 65 days.

(21) Appl. No.: 11/515,517

(22) Filed: Sep. 1, 2006

(51) Int. Cl.
*G06F 7/00* (2006.01)

(52) U.S. Cl. .................. 701/51; 701/55; 701/68; 477/169

(58) Field of Classification Search .......... 701/51, 701/54, 55, 56, 67, 68, 60; 477/161, 166, 477/169, 168, 156, 175, 176, 174; 192/3.51, 192/3.54, 3.63
See application file for complete search history.

(56) References Cited

U.S. PATENT DOCUMENTS

| 5,908,095 | A  | * | 6/1999  | Jackel et al.   | 192/70.17 |
|-----------|----|---|---------|-----------------|-----------|
| 6,299,565 | B1 | * | 10/2001 | Jain et al.     | 477/143   |
| 6,486,183 | B1 | * | 11/2002 | Salhberg et al. | 514/344   |
| 6,568,256 | B1 | * | 5/2003  | Lee             | 73/118.1  |
| 6,780,141 | B1 | * | 8/2004  | Kao et al.      | 477/164   |
| 6,834,225 | B1 | * | 12/2004 | Jiang et al.    | 701/67    |

* cited by examiner

*Primary Examiner*—Richard M. Camby
(74) *Attorney, Agent, or Firm*—Christopher DeVries

(57) ABSTRACT

A method of dynamically controlling pressure to a torque converter clutch (TCC) of a torque converter coupled to a transmission is provided. The method includes: monitoring throttle position; monitoring engine speed; controlling pressure to the torque converter clutch to increase slip after the throttle position indicates a tip-in has occurred and when engine speed is low; regulating at least one of a transmission steady state pressure to the transmission and pressure to the torque converter to maintain the increased slip; and controlling pressure to the torque converter to reduce slip by engaging the torque converter clutch.

17 Claims, 5 Drawing Sheets

| | |
|---|---|
| Inactive to Target Determination Transition | Current throttle position is greater than a minimum. |
| | Filtered throttle gradient is greater than a minimum. |
| | Change in filtered throttle gradient is within a range. |
| | Transmission temperature is less than a maximum |
| | Engine Speed is within a range. |
| Target Determination to Maintain Transition | A predetermined timeout occurs. |
| | For a predetermined period of time: filtered throttle gradient is less than or equal to a maximum; engine torque is greater than or equal to a minimum |
| Maintain to Pressure Regulation Transition | A predetermined timeout occurs. |
| | Delta throttle position is within a range. |
| | For a predetermined period of time: Engine speed at time T minus engine speed at time T-1 is less than zero. Engine speed at time T minus engine speed at time T-1 is greater than a minimum. |
| Pressure Regulation to Inactive Transition | An absolute value of slip error is less than a threshold. |
| | Delta throttle is less than a threshold. |
| | TCC On mode request is equal to FALSE. |
| | Turbine speed divided by engine speed is greater than a minimum. |
| Maintain to Pressure Correction Transition | For a predetermined period of time: Engine speed at time T minus engine speed at start is greater than or equal to a threshold. Engine speed at time T is greater than a percent of target engine speed. |
| Pressure Correction to Pressure Regulation | Delta throttle position is within a range. |
| | Engine speed at time T minus engine speed at time t-1 is less than zero |
| | Engine Speed at time T minus engine speed at time T-1 is greater than a minimum for two loops. |

*Figure 5*

TORQUE CONVERTER CLUTCH DYNAMIC CONTROL

FIELD

The present disclosure relates to methods and systems for controlling a torque converter clutch.

BACKGROUND

The statements in this section merely provide background information related to the present disclosure and may not constitute prior art.

Automatic transmissions use a fluid clutch known as a torque converter to transfer engine torque from the engine to the transmission. The torque converter operates through hydraulic force provided by pressurized fluid from the automatic transmission. The torque converter multiplies engine torque and directs it through the transmission.

A conventional torque converter includes a sealed chamber filled with hydraulic fluid. The chamber includes a pump (or impeller) driven by the engine, a turbine connected to an output shaft, and a stator that provides torque multiplication. As the impeller rotates, the centrifugal force pushes the pressurized fluid outward, causing the turbine to rotate. Fluid exiting the turbine strikes the stator. Blades of the stator act to reverse the radial direction of the fluid's motion so that the fluid is moving the same direction as the impeller when it reenters the impeller chambers. This reversal of direction greatly increases the efficiency of the impeller. The force of the fluid striking the stator blades also exerts torque on the turbine output shaft, providing additional torque multiplication equivalent to a higher numerical gear ratio.

A torque converter is said to "slip" when the impeller speed and the turbine speed are not equivalent. High slip rates reduce the efficiency of the torque converter and may generate excessive heat. Some converters incorporate a lockup mechanism such as a mechanical clutch that engages at cruising speeds to physically link the impeller with the turbine. The physical link causes the impeller and the turbine to rotate at the same or near the same speed, thereby reducing or eliminating slip. The clutch is applied and released via fluid supplied through a hollow shaft at the center axis of the rotating converter assembly.

Engaging the torque converter clutch is not desirable in all modes of vehicle operation. Lockup conditions prevent the torque converter from providing torque multiplication. Instances may occur, for example, when driving along the highway and the driver steps on the accelerator pedal to pass another vehicle (referred to below as a throttle tip-in). The vehicle is operating in a higher gear with low engine speed (i.e. less than 2000 rpm) and the torque converter clutch is locked. If the current speed is above the requisite speed to initiate a downshift, the engine will remain at the low speed and the lockup will prevent torque transfer that is sufficient to accelerate the vehicle.

SUMMARY

Accordingly, a method of dynamically controlling pressure to a torque converter clutch (TCC) of a torque converter coupled to a transmission is provided. The method includes: monitoring throttle position; monitoring engine speed; controlling pressure to the torque converter clutch to increase slip after the throttle position indicates a tip-in has occurred and when engine speed is low; regulating at least one of a transmission steady state pressure to the transmission and pressure to the torque converter to maintain the increased slip; and controlling pressure to the torque converter to reduce slip by engaging the torque converter clutch.

In other features, a dynamic torque converter clutch control system, for torque converters coupled to a transmission is provided. The system includes: a dynamic mode module that selects a current mode from an inactive mode, a target determination mode, a pressure regulation mode, and a pressure correction mode; a target determination module that determines target values for engine speed, engine torque and slip error based on the current mode and throttle position; and a torque convert clutch pressure control module that controls pressure to the torque converter clutch based on the current mode and the target values for engine speed, engine torque, and slip error.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a table that lists conditions for each TCC dynamic control transition.

DETAILED DESCRIPTION

Figure 1:
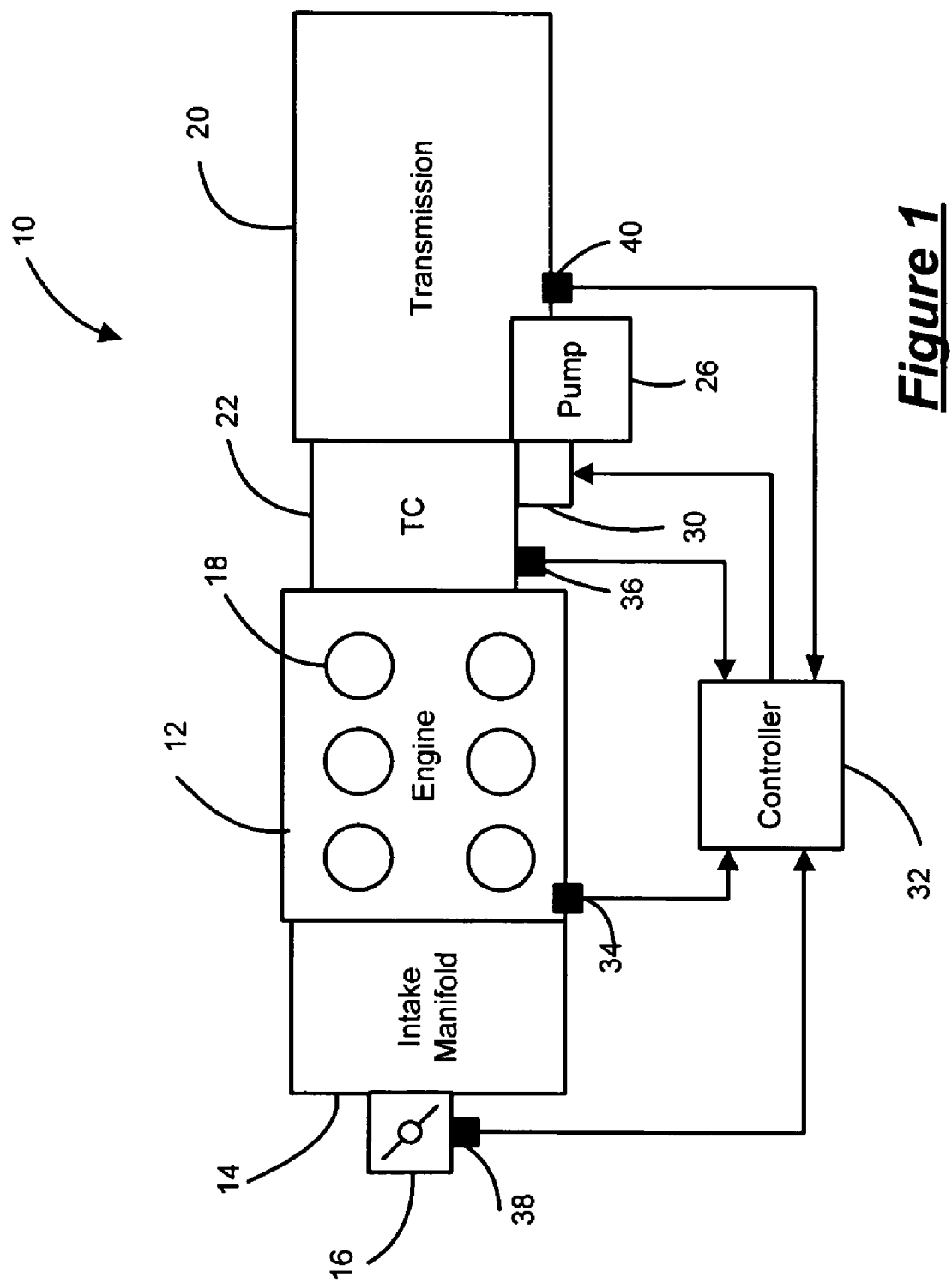
FIG. 1 is a functional block diagram of a vehicle including a conventional torque converter system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 illustrates a vehicle 10 that includes a conventional torque converter system. An engine 12 combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although six cylinders 18 are illustrated, it can be appreciated that the engine can have a plurality of cylinders including, but not limited to, 2, 3, 5, 6, 8, 10, 12 and 16 cylinders.

Torque from the engine 12 is supplied to a transmission 20 through a torque converter (TC) 22. The torque converter may be any known lockup converter including a turbine, a stator, and a torque converter clutch (TCC). The transmission includes a hydraulic pump 26 that regulates pressurized fluid within the transmission and controls fluid flow to and from the TC 22 via at least one solenoid-operated valve 30.

The engine 12 drives the hydraulic pump 26. A current and/or pulse width modulated signal is commanded by a controller 32 to the solenoid in order to vary the supply of pressurized fluid to the torque converter 22. A slip rate of the TC 22 is varied based on control of the pressurized fluid.

The controller 32 determines the appropriate signal based on inputs received from the TC 22, the engine 12, and the transmission 20. Inputs to the controller 32 may include: an engine speed signal received from an engine speed sensor 34; a turbine speed signal received from a turbine speed sensor 36; a throttle position signal received from a throttle position sensor 38, and a transmission oil temperature signal received from a transmission oil temperature sensor 40. During normal operating conditions, the controller 32 determines the appropriate pressure to be supplied to the TC 22 based on conventional methods and commands the signal to the solenoid 30 accordingly. During low engine speed conditions (i.e. less than 2000 RPM) after a throttle tip-in occurs, the controller commands the signal to the solenoid 30 according to the TCC dynamic control method of the present disclosure.

Figure 2:
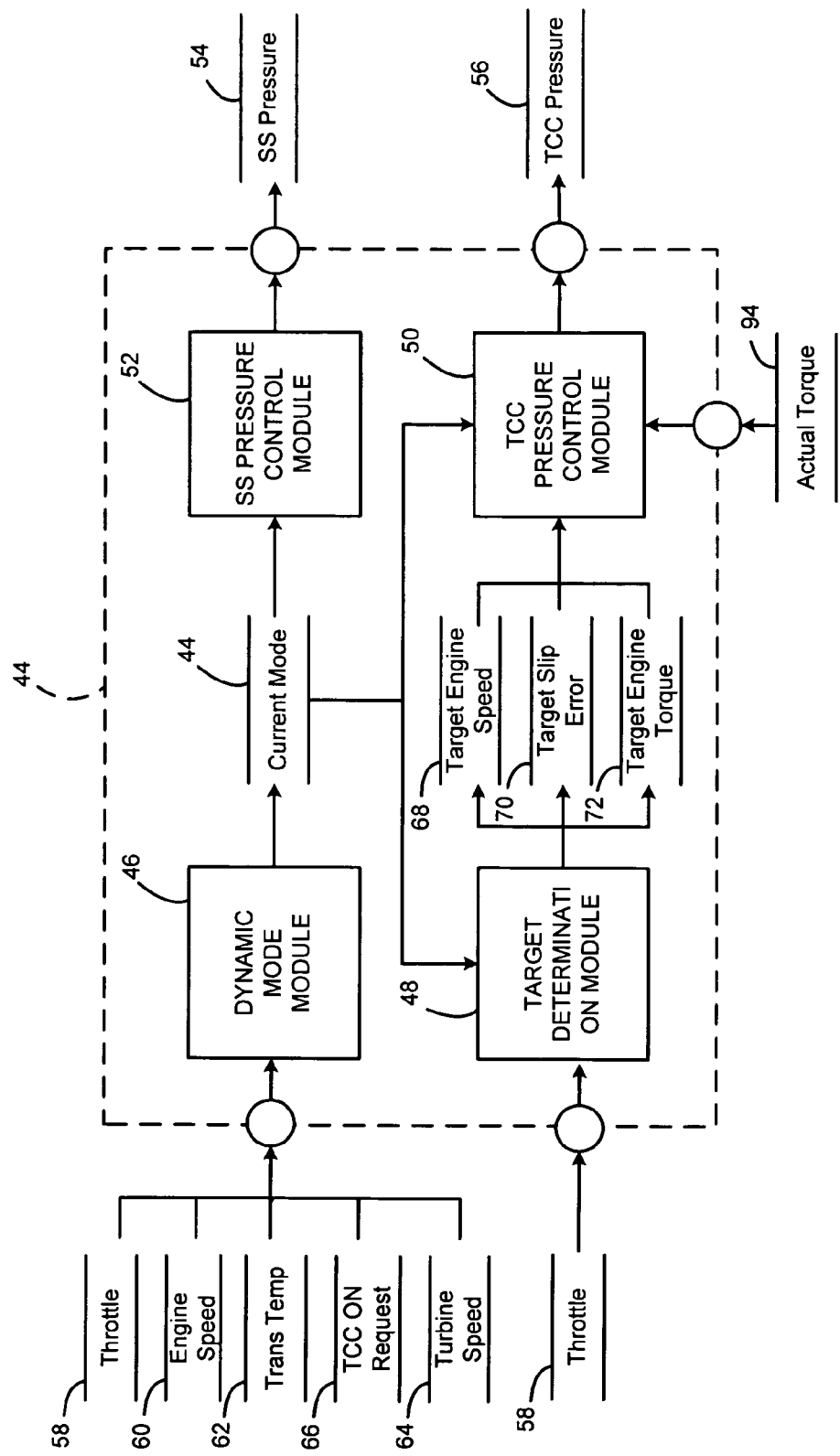
FIG. 2 is a dataflow diagram illustrating the torque converter clutch (TCC) dynamic control system.

Referring to FIG. 2, a dataflow diagram illustrates various embodiments of a TCC dynamic control system 44 that implements the TCC dynamic control method. The TCC dynamic control system operates to command hydraulic pressure to the TCC. More specifically, the dynamic control system operates to apply the TCC via the pressurized fluid at low engine speeds (i.e. less than 2000 rpm) and after throttle tip-in operating conditions occur. Various embodiments of TCC dynamic control systems according to the present disclosure may include any number of sub-modules embedded within the controller 32 of FIG. 1.

In various embodiments, the TCC dynamic control system 44 of FIG. 2 includes a dynamic mode module 46, a target determination module 48, a TCC pressure control module 50, and a steady state (SS) pressure control module 52. The sub-modules shown may be combined and/or further partitioned to provide similar control of hydraulic pressure to the TC 22. After throttle tip-in conditions occur, the modules act collectively to control TCC pressure 56 to increase TCC slip, regulate a transmission steady state pressure 54 and TCC pressure 56 to control the higher slip, and then control TCC pressure 56 to reduce slip to meet the TCC on mode requirements.

In order to control slip in this manner, the TCC dynamic control system 44 transitions through a plurality of modes. The dynamic mode module 46 determines a current mode 57 based on inputs such as throttle position 58, engine speed 60, transmission temperature 62, turbine speed 64, and a TCC mode request 66. The current mode 80 can be at least one of an inactive mode, a target determination mode, a maintain mode, a pressure correction mode, and a pressure regulation mode. Based on the current mode, the target determination module 48 determines a target value for engine speed 68, slip error 70, and engine torque 72. Each target valve is determined based on an evaluation of throttle position 58. The target values (68–72) and the current mode 57 are used by the TCC pressure control module 50 and the SS pressure control module 52 to control hydraulic pressure to the torque converter 22 (FIG. 1) and the transmission 20 (FIG. 1) respectively.

The TCC pressure control module 50, more specifically, calculates a dynamic TCC pressure 56 as a function of target engine torque 72 and target engine speed 68. When in the target determination mode, TCC pressure is set equal to a minimum of the dynamic TCC pressure and the TCC pressure estimated for normal conditions. When in the maintain mode, TCC pressure remains equal to the dynamic TCC pressure calculated at the transition into the maintain mode. When in the pressure correction mode, TCC pressure is set equal to the dynamic TCC pressure. When in the TCC pressure regulation mode, TCC pressure is set equal to the dynamic TCC pressure plus a ramp offset. The ramp offset is determined based on the target slip error 70.

The SS pressure control module 52 determines a SS pressure 54 to be supplied to the transmission 20 (FIG. 1). When in the target determination mode, the maintain mode, and the pressure correction mode, the SS pressure 54 is set to a maximum of a plurality of determined values. The SS pressure 54 can be set equal to the maximum of a determined steady state pressure, a steady state line pressure at time T−1, a base pressure plus a throttle modifier, and a base pressure plus a TCC throttle modifier. When in the pressure regulation mode, the SS pressure 54 is determined by the following two steps: during time $T_1$ SS pressure 54 equals the SS pressure determined at the transition to the TCC pressure regulation mode; during time $T_2$ SS pressure 54 is decreased according to a determined time ratio.

Figure 3:
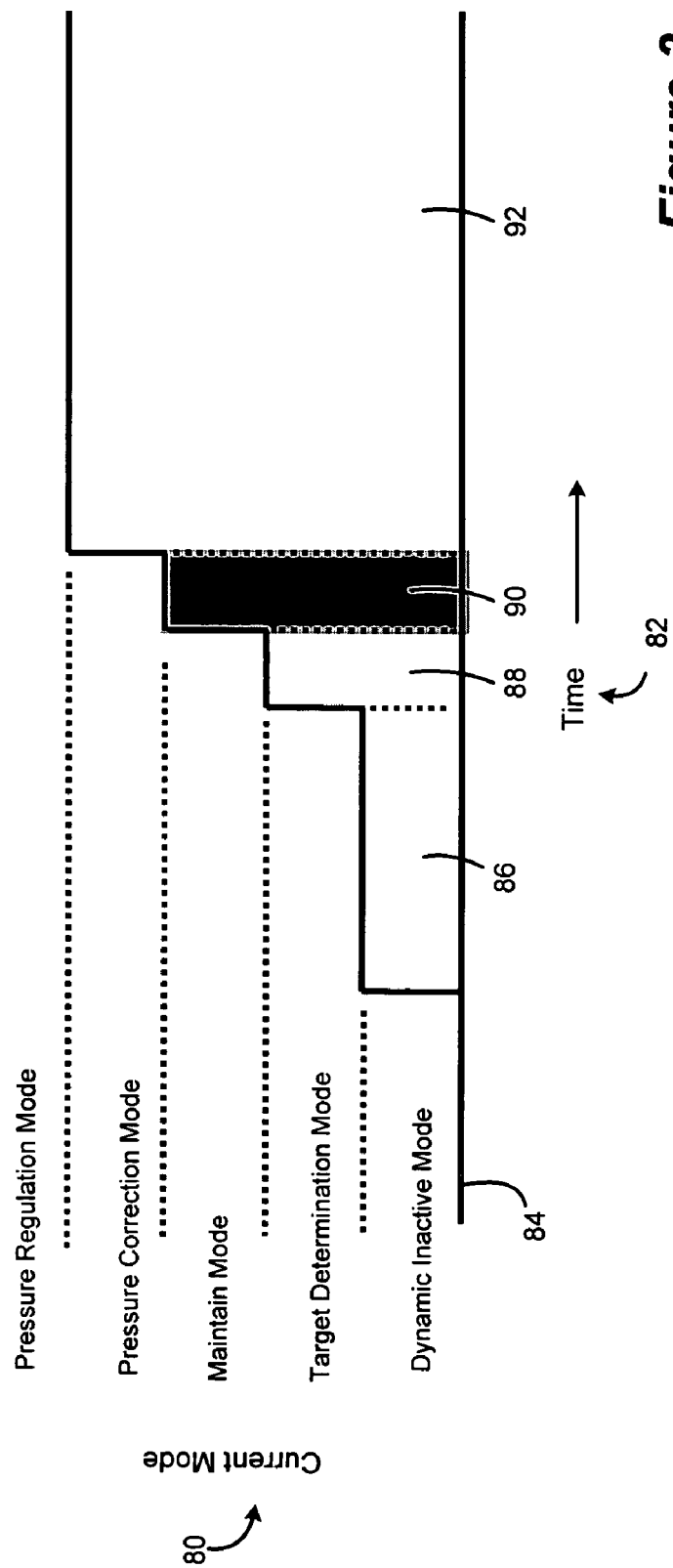
FIG. 3 is a graph illustrating modes of the TCC dynamic control system.

Referring to FIG. 3 in view of FIG. 2, a graph illustrates the various modes of the TCC dynamic control system 44 and their sequential execution. The current mode is illustrated along the y-axis at 80. Time is illustrated along the x-axis at 82. TCC dynamic operation begins in the inactive mode 84. While in the inactive mode 84 TCC operation is controlled based on conventional TCC control methods. From the inactive mode 84, TCC dynamic operation transitions to the target determination mode 86 upon which the target determination module 48 determines target values for controlling TCC pressure. Based on the target values, the TCC pressure control module 50 commands TCC pressure such that slip is increased.

From the target determination mode 86, TCC dynamic operation transitions to the maintain mode 88. In the maintain mode 88, TCC pressure control module 50 commands the TCC pressure determined in the target determination mode in order to maintain the increased slip. The higher slip will increase torque output. Thus, causing the engine to accelerate according to the throttle tip-in request (high TCC slip leads to low hydraulic torque). From the maintain mode 88, TCC dynamic operation may transition to the pressure correction mode 90 or the pressure regulation mode 92. The pressure correction mode 90 is optional. The pressure correction mode 90 is activated to allow the TCC pressure control module 50 to correct TCC pressure based on a comparison of actual engine torque 94 and target engine torque 72. If the actual engine torque 94 is greater than target engine torque 72, the TCC pressure control module 50 commands TCC pressure such that slip is reduced. While in the pressure regulation mode 92, the TCC pressure control module 50 controls TCC pressure such that slip is reduced over time, until static regulation is reached. This causing a progressive acceleration of the vehicle.

Figure 4:
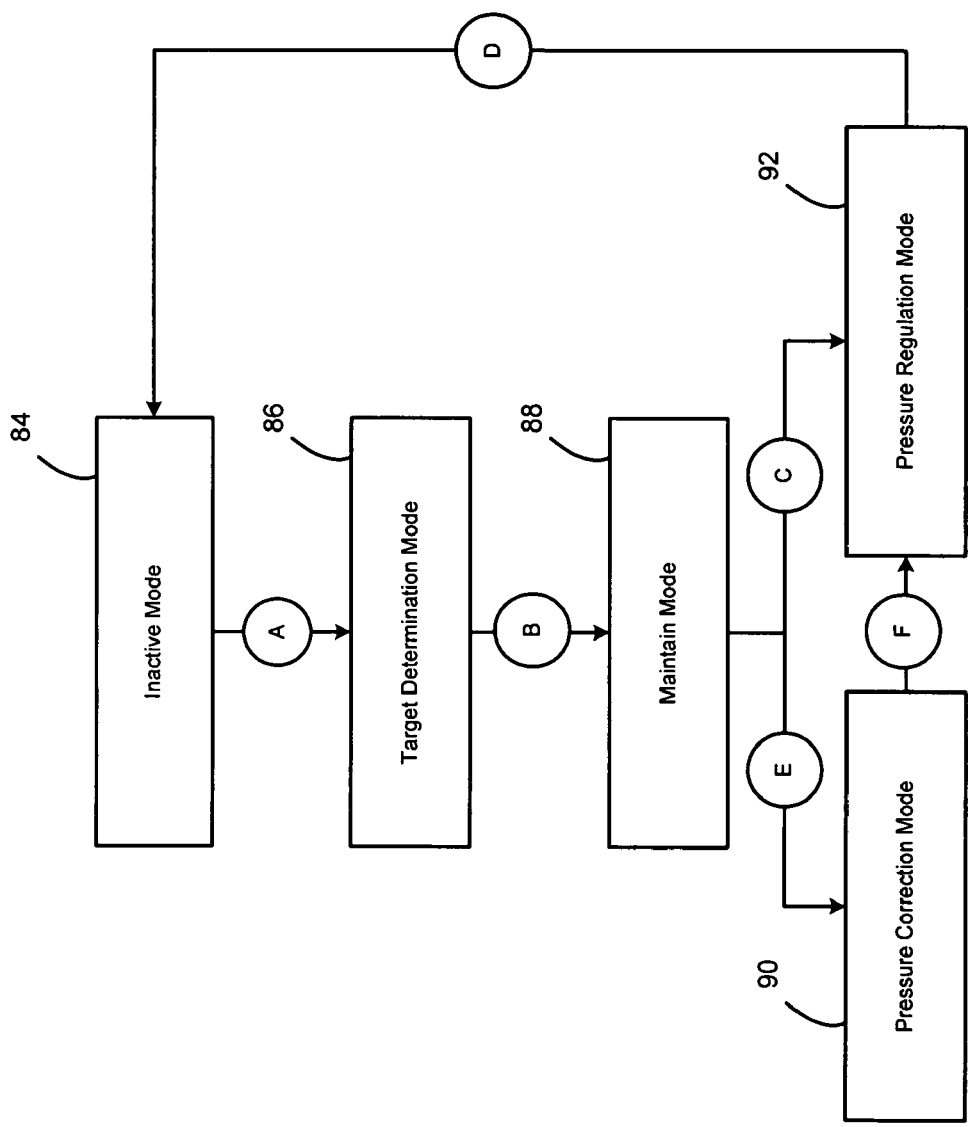
FIG. 4 is a state transition diagram illustrating the transitions between modes of the TCC dynamic control system.

Referring now to FIGS. 4 and 5, the dynamic mode module 46 of FIG. 2 determines when to transition between the five modes. The transitions are governed by a rule set including a plurality of conditions. A first transition occurs between the inactive mode 84 and the target determination mode 86 labeled as A in FIG. 4. Control transitions from the inactive mode 84 to the target determination mode 86 based on throttle position, transmission temperature, and engine speed. Table 1 of FIG. 5 lists conditions for transitioning from the inactive mode to the target determination mode.

The filtered throttle gradient listed in Table 1 is determined from the following equation:

$$TG_{Filt} = \frac{(K1 * TG + K2 * TG_{prev})}{(K1 + K2)}. \quad (1)$$

K1 and K2 are predetermined constants. TG is a throttle gradient calculated based on throttle position at time T ($T_T$) and throttle position at time T−1 ($T_{T-1}$) and the following equation:

$$TG = \frac{T_T - T_{T-1}}{\text{Loop Rate}}. \quad (2)$$

$TG_{prev}$ is a previously calculated throttle gradient.

A second transition occurs between the target determination mode 86 and the maintain mode 88 labeled as B in FIG. 4. Control transitions from the target determination mode 86 to the maintain mode 88 based on time, throttle position, and engine torque. Table 1 of FIG. 5 lists conditions for transitioning from the target determination mode 86 to the maintain mode 88.

A third transition occurs between the maintain mode 88 and the pressure regulation mode 92 labeled as C in FIG. 4. Control transitions from the maintain mode 88 to the pressure regulation mode 92 based on time, throttle position, and engine speed. Table 1 of FIG. 5 lists exemplary conditions for transitioning from the maintain mode 88 to the pressure regulation mode 92. A fourth transition occurs between the pressure regulation mode 92 and the inactive mode 84 labeled as D in FIG. 4. Control transitions from the pressure regulation mode 92 back to the inactive mode 84 based on slip error, throttle position, engine speed, turbine speed, and a TCC On mode request. Table 1 of FIG. 5 lists conditions for transitioning from the pressure regulation mode 92 to the inactive mode 84.

A fifth optional transition occurs between the maintain mode 88 and the pressure correction mode 90 labeled as E in FIG. 4. Control may transition from the maintain mode 88 to the pressure correction mode 90 based on time and engine speed. Table 1 of FIG. 5 lists conditions for transitioning from the maintain mode 88 to the pressure correction mode 92. A sixth transition occurs between the pressure correction mode 90 and the pressure regulation mode 92 labeled as F in FIG. 4. Control transitions from the pressure correction mode 90 to the pressure regulation mode 92 based on throttle position and engine speed. Table 1 of FIG. 5 lists conditions for transitioning from the pressure correction mode 90 to the pressure regulation mode 92.

As can be appreciated, all comparisons made in Tables 1 of FIG. 5 can be implemented in various forms depending on the selected values for the minimums, the maximums, the ranges, and the threshold values. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A method of dynamically controlling pressure to a torque converter clutch (TCC) of a torque converter coupled to a transmission, comprising:
   monitoring throttle position;
   monitoring engine speed;
   controlling pressure to the torque converter clutch to increase slip after the throttle position indicates a tip-in has occurred and when engine speed is low;
   regulating at least one of a transmission steady state pressure to the transmission and pressure to the torque converter to maintain the increased slip; and
   controlling pressure to the torque converter to reduce slip by engaging the torque converter clutch.

2. The method of claim 1 further comprising:
   operating in at least one of a an inactive mode, a target determination mode, a maintain mode, a pressure correction mode, and a pressure regulation mode;
   transitioning between the at least one of the inactive mode, the target determination mode, the maintain mode, the pressure correction mode, and the pressure regulation mode based on at least one of throttle position, engine speed, transmission temperature, turbine speed, and a TCC On request; and
   wherein the controlling and the regulating are based on the one of the inactive mode, the target determination mode, the maintain mode, the pressure correction mode, and the pressure regulation mode.

3. The method of claim 1 further comprising:
   determining a target engine speed, a target engine torque, and a target slip error based on throttle position;
   and wherein the controlling and the regulating are based on the target values.

4. The method of claim 2 further comprising:
   determining a throttle gradient from a first throttle position and a second throttle position;
   determining a filtered throttle gradient based on a first throttle gradient and a second throttle gradient; and
   wherein the transitioning is based on the throttle gradient and the filtered throttle gradient.

5. The method of claim 4 wherein the throttle gradient (TG) is calculated based on a first throttle position at time T ($T_T$), a second throttle position at time T−1 ($T_{T-1}$), a current execution time (Loop Rate), and from an equation:

$$TG = \frac{T_T - T_{T-1}}{\text{Loop Rate}}.$$

6. The method of claim 4 wherein the filtered throttle gradient ($TG_{Filt}$) is calculated based on constants (K1 and K2), a first throttle gradient (TG), a second throttle gradient that is calculated previous ($TG_{prev}$) to the first throttle gradient (TG), and from an equation:

$$TG_{Filt} = \frac{(K1 * TG + K2 * TG_{prev})}{(K1 + K2)}.$$

7. A dynamic torque converter clutch control system, for torque converters coupled to a transmission, comprising:
- a dynamic mode module that selects a current mode from an inactive mode, a target determination mode, a pressure regulation mode, and a pressure correction mode;
- a target determination module that determines target values for engine speed, engine torque, and slip error based on the current mode and throttle position; and
- a torque convert clutch pressure control module that controls pressure to the torque converter clutch based on the current mode and the target values for engine speed, engine torque, and slip error.

8. The system of claim 7 further comprising a steady state pressure module that controls a steady state pressure to the transmission based on the mode.

9. The system of claim 7 wherein the dynamic mode module selects the mode based on at least one of throttle position, engine speed, transmission temperature, turbine speed, and a TCC mode request.

10. The system of claim 9 wherein the torque converter clutch pressure control module controls pressure to the torque converter to increase slip when in the target determination mode; to maintain the increased slip when in the maintain mode; and to decrease slip when in the pressure regulation mode.

11. The method of claim 9 wherein the torque converter control pressure control module corrects pressure to the torque converter clutch based on a comparison of actual engine torque and the target value for engine torque when in the pressure correction mode.

12. The system of claim 8 wherein the steady state pressure module controls a steady state pressure to the transmission based on a maximum of a determined steady state pressure, a steady state line pressure at time T−1, a base pressure plus a throttle modifier, and a base pressure plus a throttle modifier for torque converter clutch.

13. The system of claim 12 wherein the steady state pressure module controls a steady state pressure by decreasing pressure according to a determined time ratio.

14. The system of claim 7 wherein the dynamic mode module determines a current mode based on a throttle gradient and a filtered throttle gradient.

15. The system of claim 14 wherein the dynamic mode module calculates the throttle gradient (TG) based on a first throttle position at time T ($T_T$), a second throttle position at time T−1 ($T_{T-1}$), a current execution time (Loop Rate), and from an equation:

$$TG = \frac{T_T - T_{T-1}}{\text{Loop Rate}}.$$

16. The system of claim 14 wherein the dynamic mode module calculates a filtered throttle gradient ($TG_{Filt}$) based on constants (K1 and K2), a first throttle gradient (TG), a second throttle gradient that calculated previously ($TG_{prev}$), and from an equation:

$$TG_{Filt} = \frac{(K1 * TG + K2 * TG_{prev})}{(K1 + K2)}.$$

17. The system of claim 7 wherein the dynamic mode module governs transitions between at least one of the inactive mode, the target determination mode, the pressure regulation mode, and the pressure correction mode based on the current mode.

* * * * *